(12) United States Patent
Carroll

(10) Patent No.: US 12,466,524 B2
(45) Date of Patent: Nov. 11, 2025

(54) BOAT FENDER

(71) Applicant: MATCEE ENTERPRISES, L.P., West Palm Beach, FL (US)

(72) Inventor: Matthew R. Carroll, West Palm Beach, FL (US)

(73) Assignee: Matcee Enterprises, L.P., West Palm Beach, FL (US)

( * ) Notice: Subject to any disclaimer, the term of this patent is extended or adjusted under 35 U.S.C. 154(b) by 463 days.

(21) Appl. No.: 18/298,859

(22) Filed: Apr. 11, 2023

(65) Prior Publication Data

US 2023/0348029 A1 Nov. 2, 2023

Related U.S. Application Data

(60) Provisional application No. 63/363,863, filed on Apr. 29, 2022.

(51) Int. Cl.
*B63B 59/02* (2006.01)

(52) U.S. Cl.
CPC ........ *B63B 59/02* (2013.01); *B63B 2059/025* (2013.01)

(58) Field of Classification Search
CPC .... B63B 59/00; B63B 59/02; B63B 2059/025
USPC .......................................................... 114/219
See application file for complete search history.

(56) References Cited

U.S. PATENT DOCUMENTS

| | | | |
|---|---|---|---|
| 3,026,548 A * | 3/1962 | Dollinger | B63B 59/02 441/115 |
| 4,875,427 A | 10/1989 | Harris, Jr. | |
| 5,016,554 A * | 5/1991 | Harris, Jr. | E02B 3/26 114/220 |
| 10,640,184 B1 | 5/2020 | Acosta | |
| 2016/0304173 A1 | 10/2016 | Vanoise | |
| 2017/0233045 A1 | 8/2017 | Nelson | |

* cited by examiner

*Primary Examiner* — Daniel V Venne
(74) *Attorney, Agent, or Firm* — McHale & Slavin, P.A.

(57) ABSTRACT

A fender for boats formed from a flexible shell housing a bladder or coated with an air impervious material wherein the shell is constructed to entrap a volume of air. A reusable seal provides an air tight interior with air trapped within the interior using an interlocking closure seal. The shell includes clips attached to an open end to secure the closure seal. When the fender is in a deflated condition, the shell may be stored flat or rolled. When the fender is in an inflated condition, the seal is closed, trapping air in the interior of the fender. The upper edge of the shell is rolled and secured by clips to prevent unrolling. The fender induces a pressure in the fender cavity and reinforces the seal to prohibit air release. When the fender is sealed, the fender can be used to protect a boat impact, wherein the fender absorbs the impact load.

13 Claims, 4 Drawing Sheets

BOAT FENDER

PRIORITY CLAIM

In accordance with 37 C.F.R. § 1.76, a claim of priority is included in an Application Data Sheet filed concurrently herewith. Accordingly, the present invention claims priority to U.S. Provisional Patent Application No. 63/363,863 entitled "BOAT FENDER" filed Apr. 29, 2022, the contents of which are incorporated herein by reference.

FIELD OF THE INVENTION

This invention is directed to the field of boating and, in particular, to a boat fender that can be stored flat and inflated without compressed air.

BACKGROUND OF THE INVENTION

Boating provides those participating in the activity with an unparalleled freedom to traverse bodies of water. The mobility of a boat allows access to fishing, cruising, swimming, diving, raft-ups, restaurants, marinas, and anything else that is accessible by water. For instance, a common boating activity during hot summer days is for one boat to raft-up with other boaters and enjoy a day of swimming, sharing food, or simply relaxing with the rocking motion that a platform floating on the water provides.

A problem can occur whenever a boat is rafted-up to another boat or fixed object. Wave action can result in a harmonic imbalance wherein boat movement essentially multiplies, resulting in wave action that can quickly damage a boat. Boats are constructed from fiberglass and an impact can easily damage the gelcoat or painted finish placed over the fiberglass. Gelcoat is especially vulnerable to cracking as it is an unsaturated polyester resin that provides a hard finish, but can be cracked if flexed. Once there is a crack in the gelcoat, water intrusion can take place, which will lead to delaminating of the gelcoat from the fiberglass.

Boats employ fenders as temporary protection to inhibit damage to the boat. Fenders are constructed from a material capable of absorbing or otherwise cushioning the impact when a boat slams against another object, such as another boat or a dock. For instance, tires are considered excellent fenders and commonly found on work boats. While tires are excellent for absorbing impact, they are not suitable for recreational boats as they are unsightly, will mar fiberglass with rubber marks, and are impossible to store.

Conventional fenders commonly used on recreational boats are either inflatable or constructed of foam. The former are the most popular type, and the latter are more compact. Inflatable fenders are constructed of a thick polymer material forming a cavity that is filled with air. The air within the fender operates to cushion the impact. Fenders are needed at certain times to protect a boat, such as when the boat is approaching a dock, approaching another boat to raft-up, or at any other time where there is a possibility of the boat impacting another object. However, fenders are only needed while the boat is approaching or tied to another object. Fenders are properly stored whenever the boat is underway.

Fenders usually feature an oblong shape. There is no rule as to the right size of fender for a boat. Typically, bigger boats employ larger fenders. However, fenders may only be needed during the docking process, and the rest of the time the fender is stored. No matter what size boat is discussed, storage of multiple fenders can be difficult. It should be noted that a properly equipped boat may have many fenders available, some or all of which could be employed. Further, while larger fenders will cause a greater separation between a boat and dock, the larger the fender, the more difficult it is to store the fender. In many instances a smaller fender is preferable, such as temporary docking at a restaurant, where a smaller fender will accomplish the intended goal of protecting the boat, yet will not create too large of a space, making entry and exiting of the boat difficult. Due to space limitations, it is not uncommon to store fenders in closets, in the engine room, or on the deck of the boat using fender holders. While storage on the deck of the boat saves valuable closet and cabinet storage space, fenders stored in the elements have a limited life before they are discolored and irreparably damaged.

Fenders consume a large amount of space, depending on the size and quantity. The size of the boat typically dictates the size and quantity of fenders. For instance, boats 20 ft-30 ft typically employ four to six 9"×30" fenders. Boats 30 ft-45 ft may employ six to eight 10"×40" fenders. Boats 45 ft-60 ft may employ 12" diameter fenders. The longer the boat, the more fenders that are needed, and the more storage space that is needed. Fenders have little or no inflation pressure. Typically, 2 lbs. of pressure is used to assure that the fenders maintain their shape.

While inflatable fenders exist, all known such fenders required air pumps or the like means to pressurize the fender structure. Inflatable fenders include: U.S. Pat. No. 10,640, 184, which discloses an inflatable boat fender that has an internal DC powered reversible air pump; the reversible pump shall having a battery compartment wherein standard DC batteries can be placed to power the reversible air pump. The inflatable boat fender can either be cylindrical or tear drop shaped. The air pump can be controlled manually or wirelessly. The air pump has an air pressure gauge that will alarm a user when the pressure is below a desired pressure.

U.S. Patent Application Publication No. 2016/0304173 discloses an inflatable fender having an inflatable first, internal, casing provided at least at one end in the continuation of the chamber with an inflatable tubular appendage equipped with a stoppered end stub, this assembly being housed inside an external second casing that hugs the first casing and the appendage and being equipped, at the neck hugging the appendage, with at least one pair of fixings of the D-ring type.

A known storable fender is disclosed in U.S. Patent Application Publication No. 2017/0233045, wherein a storable and transportable boat fender includes two fender boards, each fender board having a slot. To assemble and use the boat fender, the two fender boards are combined by inserting the slot from one board into the slot of the other board and pressing the two boards together. To store the boat fender, the boards are separated, after which they occupy a relatively small amount of space and may be stored in a number of convenient locations.

U.S. Pat. No. 4,875,427 discloses a boat fender provided with internal capacity for storage of the rope from which it is normally suspended when in use. A mechanism is also provided, retaining the rope when it is in storage and for quick release of the rope when it is withdrawn from storage for use in suspending the boat fender.

What is lacking in the industry is a boat fender that can be stored flat and then sealed with a volume of air without a pressure inducing device.

SUMMARY OF THE INVENTION

A storable fender for boats formed from a flexible shell housing a bladder constructed to entrap a volume of air.

Alternatively a shell formed from a material or including an air-impervious coating. A reusable seal is attached to the top edge of the shell to provide an air tight interior. The shell includes the use of clips attached to an open end of the shell to secure the seal. At least one grommet is secured to an outer surface of the shell to receive a line for securing the fender to a boat or structure, such as a dock.

When the fender is in a deflated condition, the shell and bladder may be stored flat or rolled into a compact configuration. When the fender is in an inflated condition, the seal is closed, trapping air in the interior of the bladder, wherein the seal maintains the bladder in a sealed condition by rolling an upper edge of the shell and securing the clips to prevent the upper edge of the bladder from unrolling. The rolling of the shell induces a pressure in the bladder, and further reinforces the seal to prohibit the seal from releasing. When the bladder is inflated, the fender can be used to protect a boat impact, wherein the fender absorbs the impact load.

An objective of the instant invention is to provide a fender that can be folded or rolled into a small configuration to facilitate storage and maintain an inflated position for use in impact protection.

Another objective of the instant invention is to provide a fender that can be employed without the need for an air pump or other inflation devices.

Still another objective of the instant invention is to provide a fender that can be easily stored below deck, away from sunlight, so as to provide longevity to the fender.

Still another objective of the instant invention is to provide a shell that can be coating with an flexible air impervious material such as rubber, PVC-vinyl, plastic or the like material.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE PREFERRED EMBODIMENT

Detailed embodiments of the instant invention are disclosed herein; however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Figure 1:
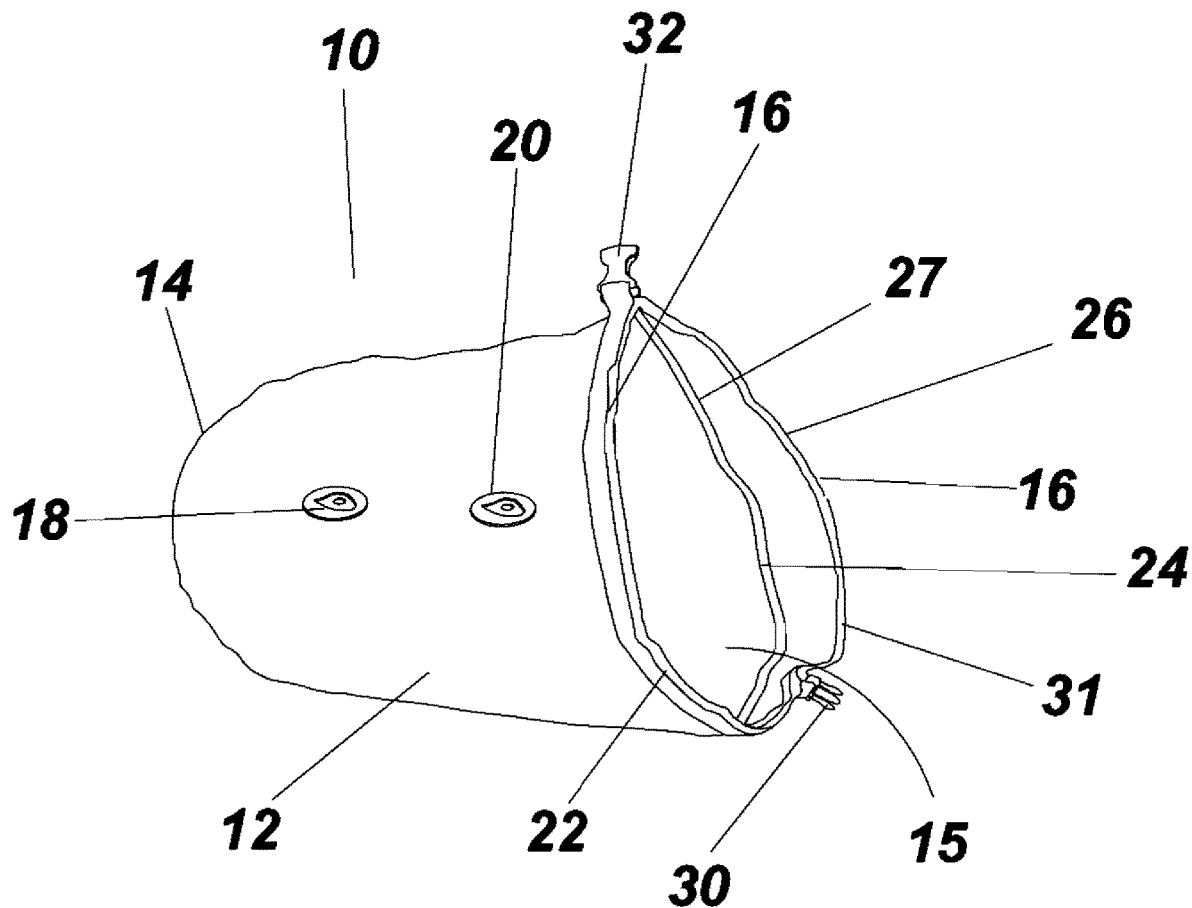
FIG. 1 is a back perspective view of the inflatable fender having sidewall grommets for line attachment.
Figure 2:
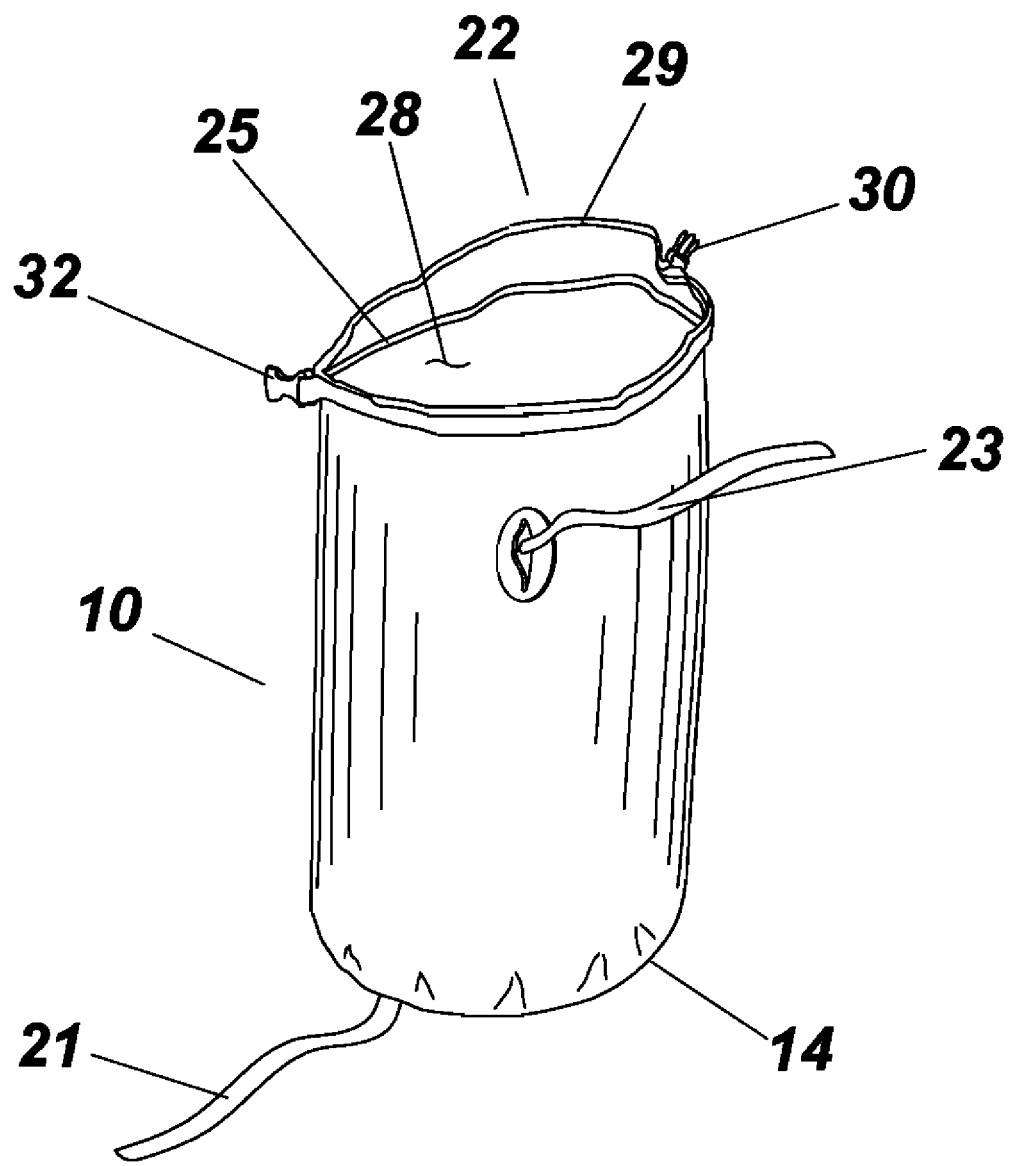
FIG. 2 is a front perspective view of the inflatable fender having lines attached in-line.

Referring now to the figures in general, FIG. 1 depicts the boat fender in an open, uninflated state defined by a shell 10 formed from a continuous outer sidewall 12, a lower edge 14 and an upper open edge 16 forming a cavity 15. The shell may be made of an air impervious material, or a material that requires either a coating or a bladder to prevent air from passing. Attached to the outer sidewall 12 are grommets 18, 20, which permit securement of lines 19, 21 shown in FIG. 3. The lines 19, 21 allow for securement of the fenders 10 to a boat or fixed object. Alternatively, lines 21, 23, shown in FIG. 2, may be secured to each end of the fender, providing a conventional in-line attachment. The upper open edge 16 is securable by use of a closure member 22 which is constructed and arranged to seal the open upper edge 16 and the cavity 15. The closure member 22 includes an upper open edge 16 having a first interlocking surface 24 consisting of grooves 25 on one side of the shell and stems 27 on the other, and a second interlocking surface 26 consisting of stems 29 on one side of the shell that are constructed and arranged to interlock with grooves 31 on the other side, the interlocking surfaces 24, 26 forming an air tight seal forming a cavity 15 filled with air within the shell.

Inside the continuous sidewall 12 which forms the cavity 15 is an air imperious coating, such as a rubberized liner, or bladder 28, attached to the sidewall 12. The liner 28 can be attached by means of heat molding to the outer sidewall 12, forming a liner that is integral with the shell, forming the cavity 15 that is accessible only through the interlocking closure 22. Other materials, such as canvas having an air imperious liner or coating, can be used and in some instances is preferable over a plastic sidewall. It is noted that plastic is imperious to air passage, and use of an outer sidewall constructed of plastic may forego the use of a liner or coating.

Clips 30, 32 are fixedly attached to the sidewall 12 by heat molding, or by being sewn to the outer sidewall 12 at each end edge of the upper open edge 16 for additional securement of the upper open edge 16. Once the upper open edge 16 is secured with air inside the bladder 28, the upper open edge 16 may be rolled one or multiple turns, which compresses the trapped air within the bladder 28. Approximately two turns will compress the bladder to about 1 psi, and securing the interlocking closure maintains the compressed air within the cavity 15. In an alternative embodiment, the rubber bladder 28 may be integrally formed into the fabric of the sidewall 12. For instance, a cloth shell would require a bladder or coating to make it impervious to the passage of air.

Figure 3:
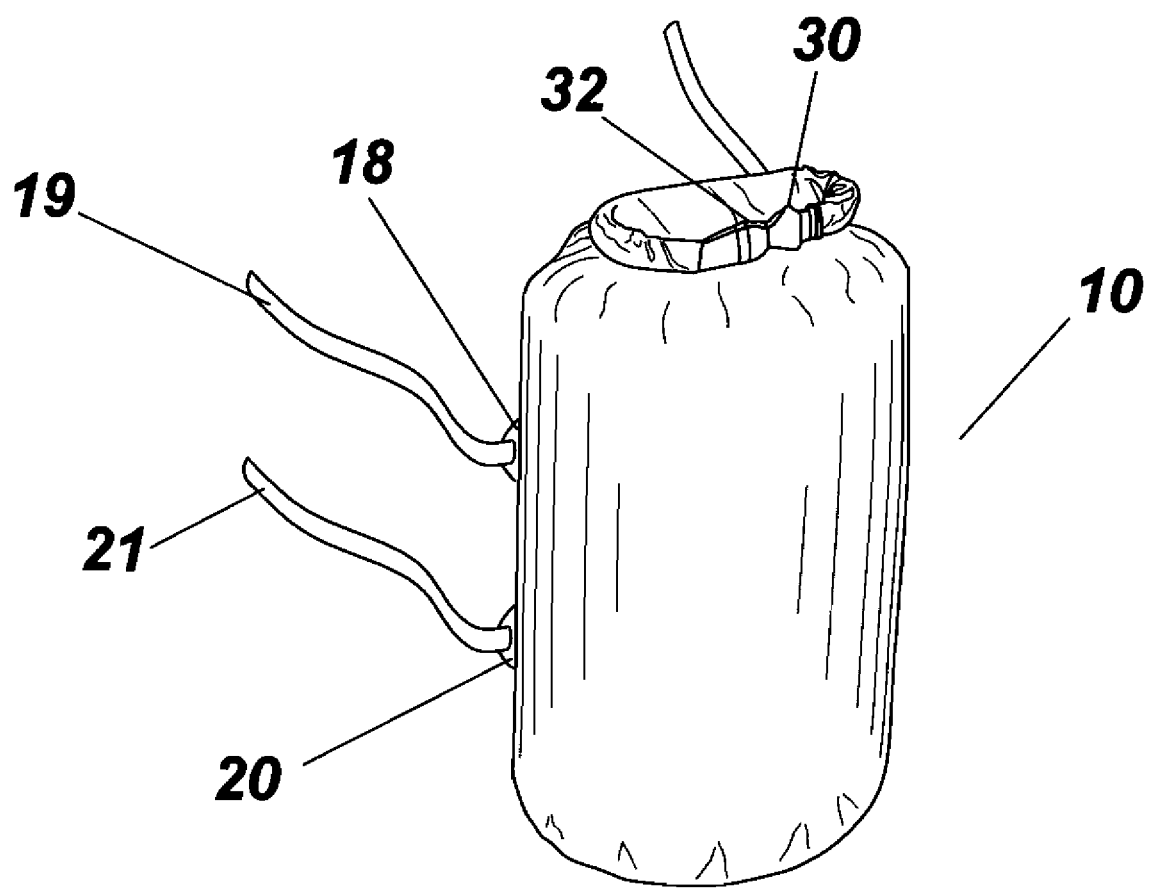
FIG. 3 is a side view thereof with the opening closed, rolled and clipped.

FIG. 3 depicts the fender 10 having the upper edge opening 16 in a secured and closed position with a clips 30, 32 securing the closure. In this position, the bladder 28 has a volume of air secured within the cavity 15 and sealed therein by the interlocking closure 22?. In furtherance of sealing the bladder 28 by use of the interlocking closure, the top of the shell is rolled, up to three times, to diminish volume of the cavity 15. The decrease in volume requires a compression of the remaining air within the bladder #. This provides the fender 10 with similar properties as a conventional boat fender, wherein the volume of air provides a cushion between a boat and pier, boat and another boat, and so forth.

Once the level of compressed air has been reached, the ends of the rolled top are snapped together to maintain the rolled position with slight air compression. However, no air pump is necessary to fill the bladder of the instant invention, the compression being a result of rolling the shell, causing compression of air within the fender 10 as the size of the cavity 15 has been reduced. Once the fender 10 has served its purpose, such as protecting the boat during a multi-boat raft up, the fender 10 can be deflated by unrolling the top and release of the interlocking closures. With the air released from the cavity, the fender 10 can be stored flat or rolled into a configuration suitable for tight spaces. Various sized fenders can accommodate a large range of boats, without consuming valuable storage space. Grommets 18 and 20 are available for securing the fender 10 to a boat or structure by the use of lines 19, 21. The grommets 18 and 20 can be placed on a sidewall 12, as depicted, or on each end of the shell in a position similar to a conventional fender relying upon a through hole or end mounted lines.

Figure 4:
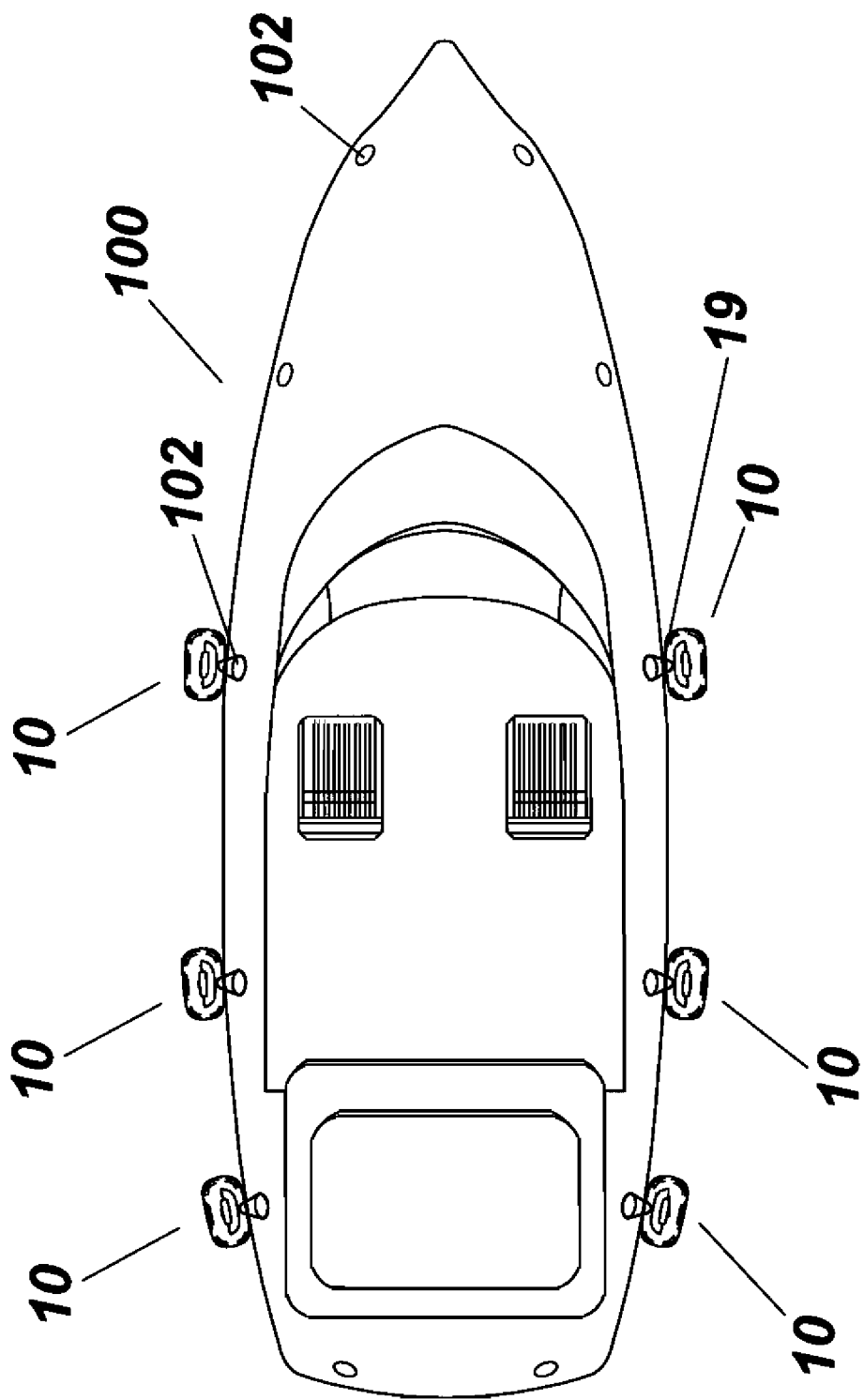
FIG. 4 is a pictorial view, depicting inflatable fenders of the instant invention attached to a boat.

FIG. 4 shows the fenders 10 in the inflated position and attached to the side of a boat 100 having cleats 102. The illustration is only for pictorial purposes; the lines 19, 21 allow attachment to railings, hard top supports, or any other object that a fender line can secure too. As previously mentioned, the fenders 10 can be stored in a deflated position, thereby consuming very little space. When needed, the fenders 10 can be instantly deployed by capturing a volume of air in the bladder lined cavity 15, sealing the volume of air within the cavity 28, and rolling a portion of the upper open edge 16 to compress the captured air. The fenders 10 can then be deployed along the sides of the boat 100 in preparation of rafting up with other boats, or securing to a fixed dock. Once the fenders 10 are sealed, and the tops rolled, the fenders 10 can absorb a very large impact without loss of air. The amount of pressure that the impact can absorb is dependent on the materials of construction. canvas The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

All patents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A fender for a boat, said fender comprising:
    a flexible shell having a continuous sidewall defined by an inner surface and an outer surface with a sealed common lower edge and an open upper edge;
    a bladder constructed and arranged to fit within said inner surface of said flexible shell, said bladder constructed of an air impervious material having a sealed bottom edge and a top edge secured to said upper edge of said bladder;
    a reusable seal attached to said top edge of said bladder, said seal providing said bladder with an air tight interior;
    a first clip attached to a first end of said flexible shell upper edge releasable securable to a second clip attached to a second end of said flexible shell upper edge; and
    at least one grommet secured to said outer surface of said flexible shell, wherein said grommet is attached to a line used to secure said fender to a fixed object;
    wherein said fender has a deflated condition in which said seal is open, allowing the flexible shell and bladder to be stored flat, and an inflated condition in which the seal is closed, trapping air in said interior of said bladder, said seal maintained in a closed position by rolling said upper edge of said shell at least two turns and attaching said first clip to said second clip to prohibit said upper edge from unrolling;
    wherein placing said fender in an inflated condition to be used to protect a boat, whereby said fender can be attached to a structure by securing a line to said grommet.

2. The fender for a boat according to claim 1 wherein an outer surface of said bladder is secured to said inner surface of said outer shell.

3. The fender for a boat according to claim 1 wherein said bladder is a liner formed integral to said shell.

4. The fender for a boat according to claim 1 wherein said bladder is rubber.

5. The fender for a boat according to claim 1 wherein said flexible outer shell and said bladder is PVC-vinyl.

6. The fender for a boat according to claim 1 wherein said flexible outer shell is canvas.

7. The fender for a boat according to claim 1 wherein said fender has a circular shape when inflated.

8. A fender for a boat, said fender comprising:
    a flexible shell constructed of an air impervious continuous sidewall defined by an inner surface and an outer surface with a sealed common lower edge and an open upper edge;
    a closure member attached to said top edge of said flexible shell, said closure member constructed and arranged to form an air tight interior;
    a first clip attached to a first end of said flexible shell upper edge releasable securable to a second clip attached to a second end of said flexible shell upper edge; and
    at least one grommet secured to said outer surface of said flexible shell, wherein said grommet is attached to a line used to secure said fender to a fixed object;
    wherein the fender has a deflated condition in which said reusable seal allows the flexible shell to be stored flat, and an inflated condition in which the reusable seal is closed, trapping air in the interior of said shell, said reusable seal maintained in a closed position by rolling said upper edge of said shell at least two turns and attaching said first clip to said second clip to prohibit said upper edge from unrolling;
wherein placing said fender in an inflated condition which can be used to protect a boat, whereby said fender can be attached to a structure by securing a line to said grommet.

9. The fender for a boat according to claim 7 wherein said air impervious continuous sidewall is an air impervious coating.

10. The fender for a boat according to claim 9 wherein said air impervious continuous sidewall is a coating of rubber.

11. The fender for a boat according to claim 9 wherein said air impervious continuous sidewall is a coating of plastic.

12. The fender for a boat according to claim 7 including a bottom having a shape constructed and arranged to configure said sidewall in a circular diameter.

13. The fender for a boat according to claim 7 wherein said closure member has a first interlocking surface consisting of grooves and a second interlocking surface consisting of stems that are constructed and arranged to interlock with the grooves, forming an interlocking closure.

* * * * *